United States Patent
Weindorf et al.

(10) Patent No.: US 6,483,245 B1
(45) Date of Patent: Nov. 19, 2002

(54) AUTOMATIC BRIGHTNESS CONTROL USING A VARIABLE TIME CONSTANT FILTER

(75) Inventors: Paul F. L. Weindorf, Novi, MI (US); Gregory J. Milne, Lathrup Village, MI (US)

(73) Assignee: Visteon Corporation, Dearborn, MI (US)

( * ) Notice: Subject to any disclaimer, the term of this patent is extended or adjusted under 35 U.S.C. 154(b) by 153 days.

(21) Appl. No.: 09/658,301

(22) Filed: Sep. 8, 2000

(51) Int. Cl.$^7$ .................................................. B60Q 1/02
(52) U.S. Cl. ......................... 315/82; 315/149; 315/159
(58) Field of Search ............................. 315/77, 80, 82, 315/149–159, 169.3; 345/7, 102

(56) References Cited

U.S. PATENT DOCUMENTS

| | | | |
|---|---|---|---|
| 5,270,818 A | * 12/1993 | Ottenstein | 358/161 |
| 5,428,265 A | 6/1995 | Booth, Jr. et al. | 315/158 |
| 5,554,912 A | * 9/1996 | Thayer et al. | 315/157 |
| 5,666,028 A | * 9/1997 | Bechtel et al. | 315/82 |
| 5,747,938 A | 5/1998 | Beard | 315/169.3 |
| 5,883,605 A | 3/1999 | Knapp | 345/7 |
| 5,952,992 A | 9/1999 | Helms | 345/102 |
| 6,188,177 B1 | * 2/2001 | Adamson et al. | 315/149 |

* cited by examiner

Primary Examiner—Don Wong
Assistant Examiner—Jimmy T. Vu
(74) Attorney, Agent, or Firm—Quarles & Brady LLP

(57) ABSTRACT

A method and apparatus is provided to control the brightness of an emissive display. Specifically, the brightness is incremented and decremented as the ambient environment becomes brighter and darker, respectively. A timing feature is also implemented to control the sensitivity of the system. Specifically, the time between adjustments of the display brightness is at least partially dependent on the magnitude of the difference between the desired brightness based on the ambient lighting environment and that of the actual display brightness.

31 Claims, 6 Drawing Sheets

AUTOMATIC BRIGHTNESS CONTROL USING A VARIABLE TIME CONSTANT FILTER

BACKGROUND OF THE INVENTION

1. Field of the Invention

The present invention relates generally to emissive displays and, in particular, relates to a method and apparatus for automatically controlling the luminance or brightness of an emissive display, such as a vehicle instrument display, based on ambient lighting conditions.

2. Discussion of the Related Art

Historically, the brightness of an emissive vehicular instrument display was adjustable by an operator to compensate for the ambient lighting conditions. For example, an operator may wish to increase the brightness during the day, and decrease the brightness at night. However, adjusting the brightness during transitory conditions became an inconvenient and dangerous task, especially while operating a motor vehicle. Recently, automatic brightness control systems have operated by automatically adjusting the brightness of a vehicular instrument display as a function of input from an ambient light sensor. For instance, if an automobile traveled from a position of sunlight into a position of shade, an ambient light detector would sense the decrease in ambient illumination, and the brightness of the corresponding instrument displays would be decreased accordingly. Conversely, if the ambient light detector sensed an increase in ambient illumination, the brightness of the instrument displays would be increased.

Unfortunately, these automatic brightness control systems are incapable of properly compensating for relatively short time durations of a large illumination gradient of the ambient environment from one time to the next. Accordingly, if a vehicle were to travel under a bridge for a short period of time, for example, the brightness of the instrument displays would be decreased, and then immediately increased once the vehicle traveled past the bridge. For such transitory conditions, it is annoying and unacceptable to the operator of the vehicle to change the display brightness at or faster than the adaptation rate of the eye. Rather, it is more desirable to have the display remain at a constant brightness level unless the ambient lighting condition is more permanent in nature, such as is the case when a vehicle passes under an elongated tunnel.

What is therefore needed is an automatic brightness control system that (1) allows an operator to compensate for his or her personal preference by manually adjusting the brightness of the display; and (2) automatically adjusts the rate of brightness change based on the magnitude of deviation of the current display brightness from the desired display brightness.

BRIEF SUMMARY OF THE INVENTION

A method and apparatus are provided having the ability to adjust the rate of brightness change of a display based on the magnitude of deviation of the current display brightness from the desired illumination, wherein the desired brightness is a function of the ambient illumination. Furthermore, the automatic brightness control system allows an operator to manually alter the determined brightness if desired.

In accordance with a first aspect of the invention, the brightness control system includes a filter that waits a predetermined amount of time according to the difference between the current display brightness and the desired display brightness. For example, if the difference between the two brightness levels is large, the process will wait a relatively long period of time before transitioning the display brightness to the desired display brightness when compared to the situation where the difference between the two values is relatively small. As a result, when an automobile travels underneath a bridge, for example, the magnitude of the difference will be relatively large for a relatively short period of time. The display brightness would likely not change in this scenario because the necessary time would not have elapsed before the ambient sensor detected a subsequent increase in illumination (as the vehicle exits from under the bridge). Specifically, the filter uses a predetermined time constant that is multiplied by the difference between the current and the desired brightness to determine the necessary time elapse before the current display brightness is adjusted.

In accordance with another aspect of the invention, an additional predetermined time interval is used to determine whether sufficient time has passed to update the DAC count which will, in turn, update the display brightness.

In accordance with another aspect of the invention, the display brightness increases at a faster rate than it decreases. Specifically, a smaller time constant is used when brighter ambient conditions are sensed, thereby resulting in a smaller update time interval. Once the change in time from the previous update has exceeded the update time, the brightness step number will be incremented or decremented, and the process will revert to the beginning of the update cycle. Therefore, the brightness control system may be used as a brightness peak detector, because the level of maximum brightness will not decrease as quickly as the brightness level is increased.

These as well as other features, aspects, and characteristics of the present invention will be apparent from the description which follows. In the detailed description below, preferred embodiments of the invention will be described with reference to the accompanying drawings. These embodiments do not represent the full scope of the invention. Rather, the invention may be employed in other embodiments. Reference should therefore be made to the claims herein for interpreting the breadth of the invention.

BRIEF DESCRIPTION OF THE DRAWINGS

References hereby made to the following figures in which like reference numerals correspond to like elements, and in which.

DETAILED DESCRIPTION OF THE PREFERRED EMBODIMENT

Figure 1:
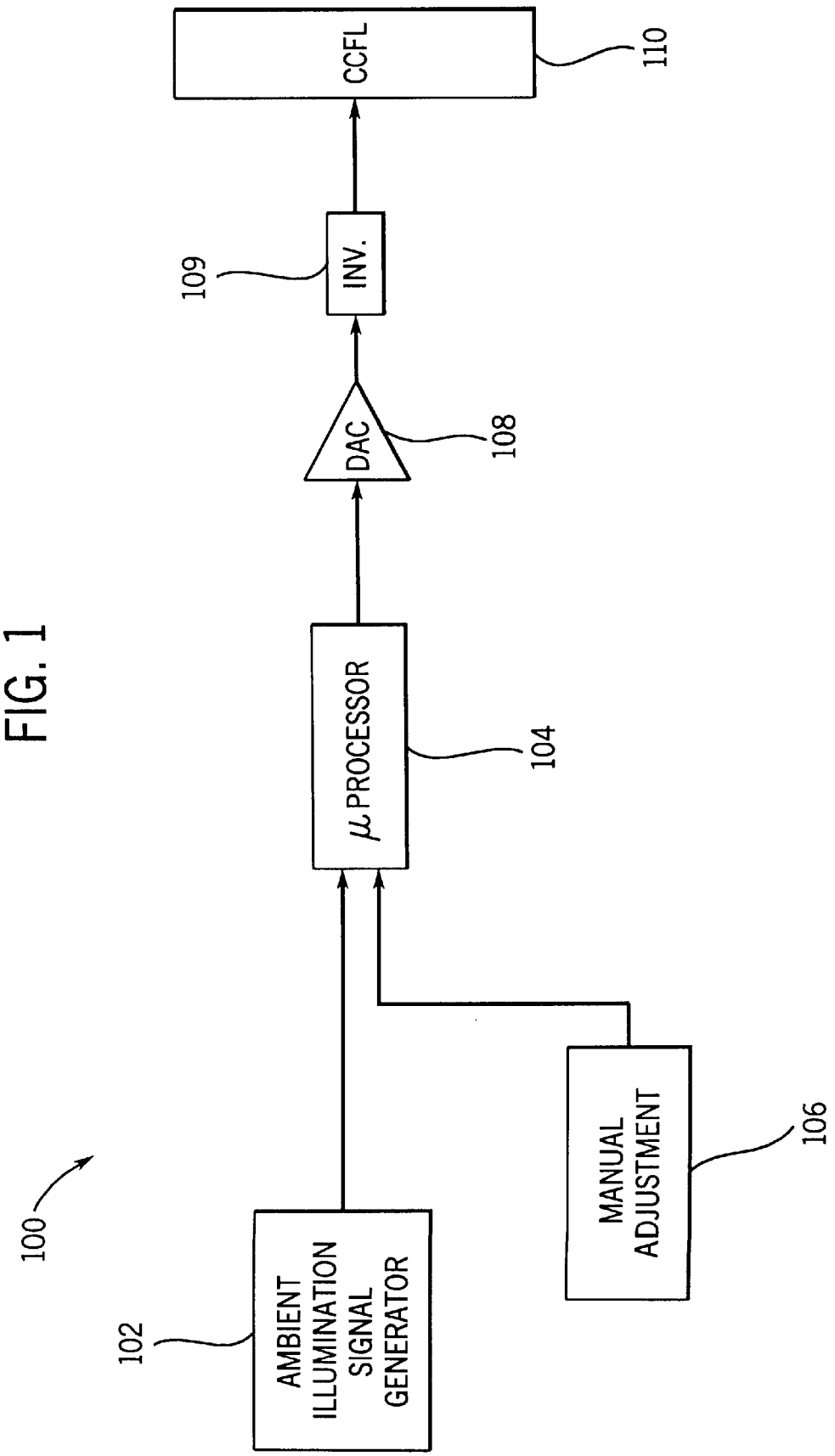
FIG. 1 is a block diagram of an automatic brightness control system which employs the preferred embodiment of the present invention.

Referring initially to FIG. 1, an automatic brightness control system 100 includes an ambient illumination signal generator 102 that detects ambient illumination conditions, typically including light that passes though a car, for example, and inputs corresponding voltage values into a microprocessor 104. The ambient illumination signal generator 102 may take many forms, as is well known in the art, such as a photodiode coupled to an analog-to-digital converter (ADC). The system 100 additionally includes a manual brightness adjustment mechanism 106, which could take many forms including a knob, that outputs user-selected brightness values to the microprocessor 104. For instance, a user may choose to increment the mechanism 106 during a relatively sunny day, and decrement the mechanism at night or during cloud coverage.

Specifically, the manual brightness adjustment mechanism 106 outputs a step number selection (SNS) having values 1 through 9 that correspond to increasing manually selected brightness levels. Because 5 is in the middle of the SNS range, the SNS output will be decreased by a value of 5 to determine the change in the manually selected brightness, as will be described below. For instance, if the user wishes to increase the brightness by 2 increments, the SNS value will be at 7, so that the difference of +2 is calculated by subtracting 5 from 7. The difference of +2 is used to modify the automatically determined brightness level by a user selected offset of 2 brightness steps. The microprocessor 104 determines differences in sensed ambient illumination levels, and alters the input voltage to DAC 108 accordingly, which correspondingly alters the brightness of a cold cathode fluorescent lamp (CCFL) 110 via an Inverter 109.

Figure 2:
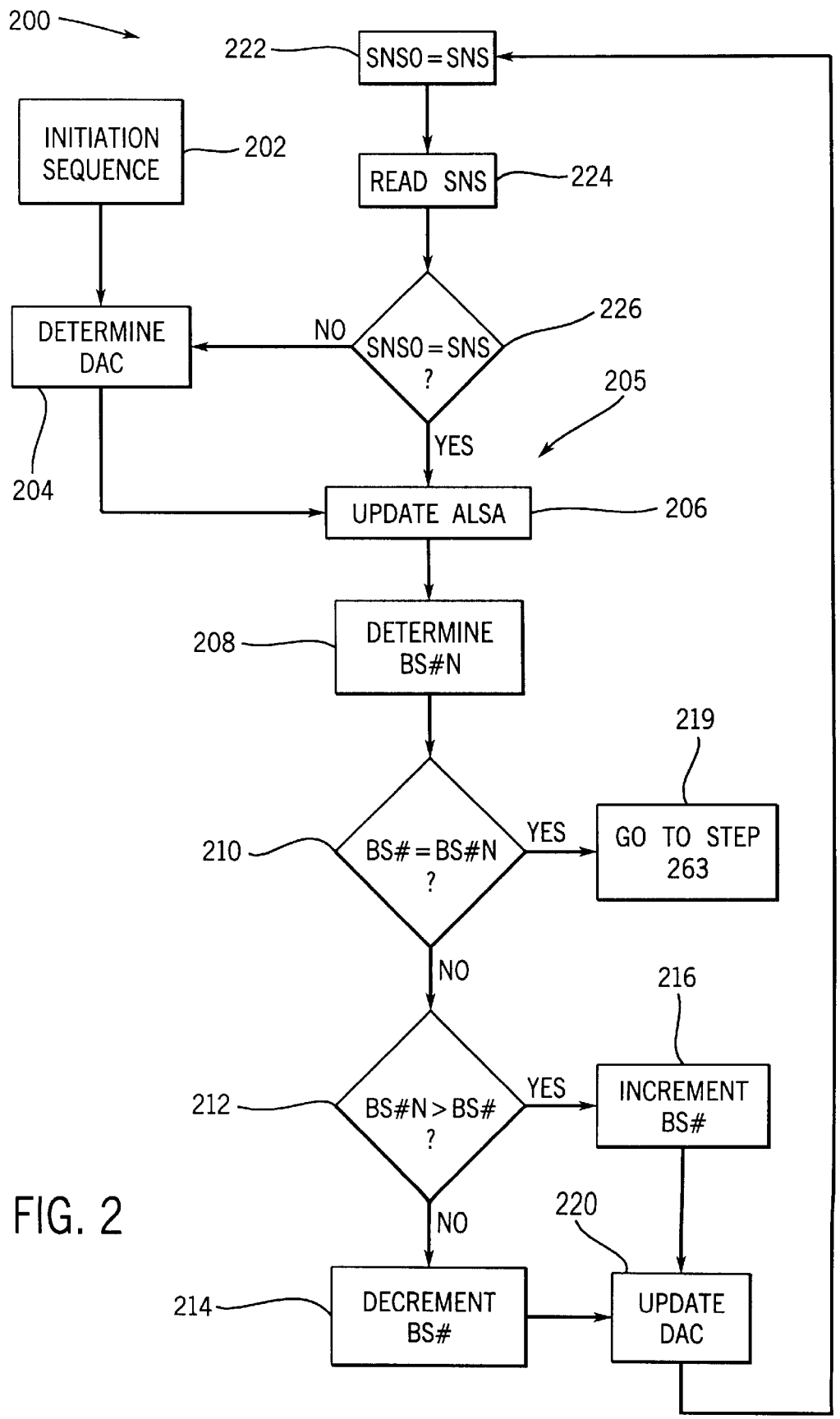
FIG. 2 is a flow chart of the steps performed to carry out the preferred embodiment.
Figure 3:
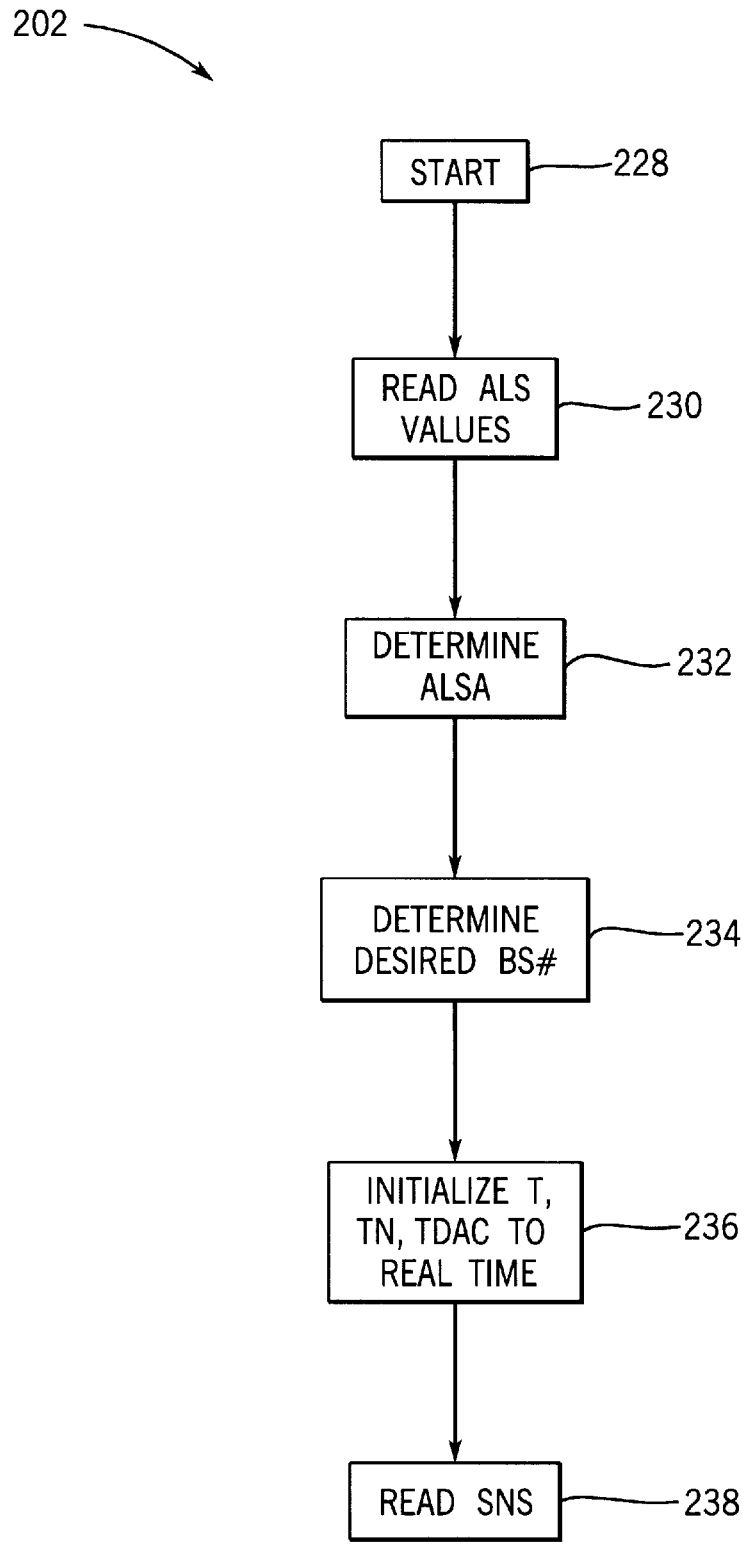
FIG. 3 is a flow chart of the steps performed to carry out the initiation sequence of FIG. 2.

Referring now to FIG. 2, the microprocessor 104 executes a stored program including an automatic brightness control sequence 200 and begins at step 202, whereby an initiation sequence is performed. Specifically, as illustrated in FIG. 3, the initiation sequence 202 commences at step 228 when an operator selects the appropriate mode on a display settings screen (not shown). Sequence 202 then proceeds to step 230, whereby a plurality of ambient light sensor values (16 in accordance with the preferred embodiment) are read from the ambient illumination signal generator 102, and these values are averaged to determine an average ambient light sensor value (ALSA) at step 232. An empirically derived look-up table (not shown) is consulted to determine a desired brightness step number (BS#) that corresponds to the ALSA at step 234. Next, at step 236, time values T, TN, and TDAC are reset to real-time in preparation for repetitions that will take place during the auto brightness sequence 200, as will be described below. At step 238, the initiation sequence 202 reads the SNS value from the manual brightness adjustment mechanism 106 to determine any necessary fine tuning to the display brightness level as defined by the operator input.

Referring again to FIG. 2, once the adjustment sequence 200 performs the initiation sequence 202, it proceeds to step 204, where the previously determined BS# is adjusted according to the operator adjustment mechanism 106. Accordingly, BS# is adjusted by subtracting 5 from the current SNS value to determine the operator-selected brightness change (recall that SNS=5 defines the middle of the SNS range). For example, if the SNS value was set to 3, the BS# would be decremented by 2 (BS#=BS#+3−5). The look-up table is then consulted to determine the corresponding DAC count. An auto loop sequence 205, comprised of blocks 206–226, then commences, and preferably updates at a rate of less than 50 milliseconds. At step 206, the ALSA is updated by first reading a new ALS value and storing it into a variable ALSAR. The new ALSA weighted average is determined by the following equation:

$$ALSA = 15/16 \times ALSA + 1/16 \times ALSAR. \quad (1)$$

Accordingly, as the auto loop 205 repeats, the ambient light sensor average is continuously updated as new ambient light sensor values are detected. Next, at step 208, a new brightness step number BS#N is determined by locating the BS# value corresponding to the updated ALSA value in the look-up table.

Figure 4:
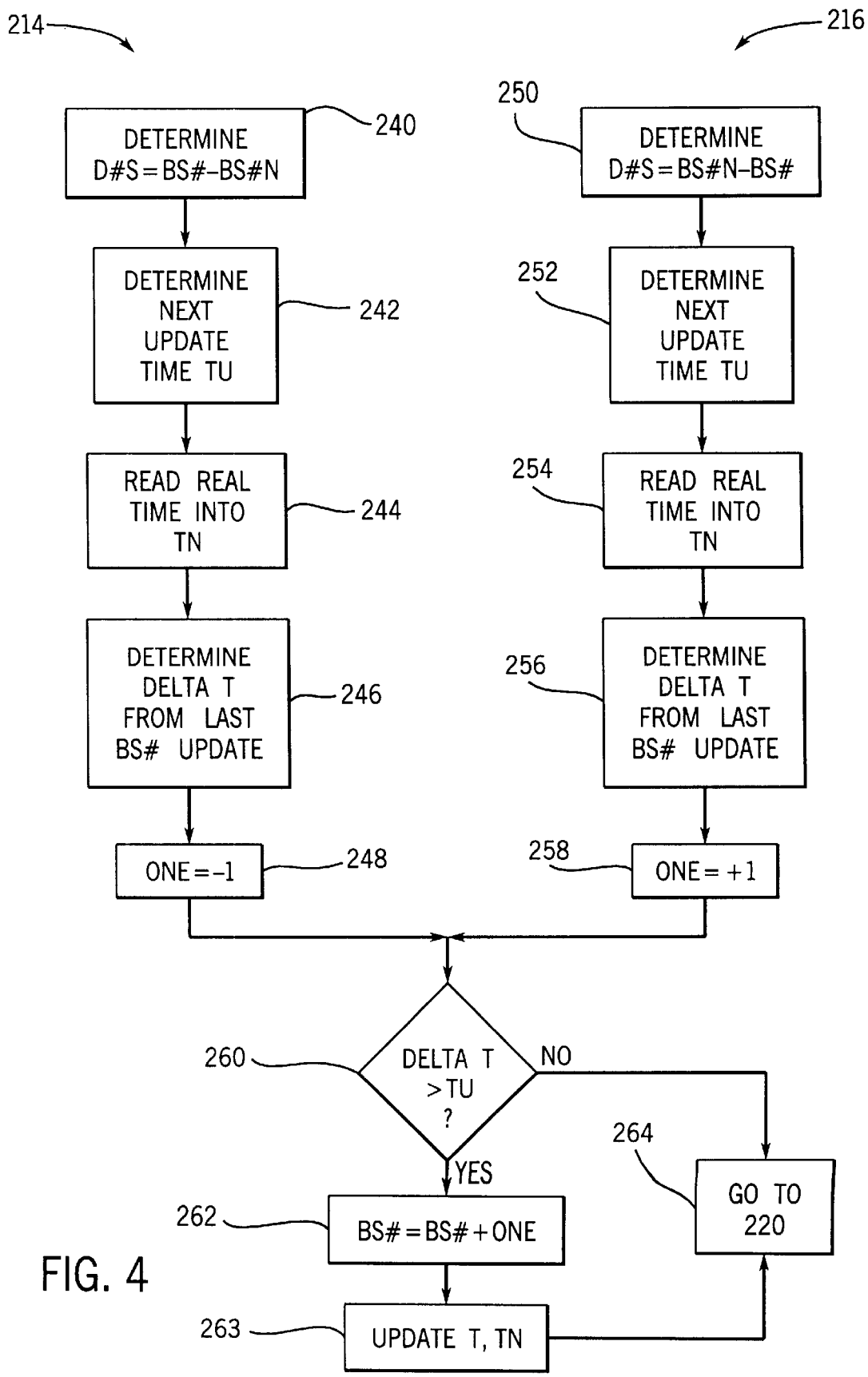
FIG. 4 is a flow chart of the steps performed to carry out the brightness step number incrementation and decrementation steps of FIG. 2.

Once the previously determined brightness step number (BS#) and new brightness step number (BS#N) are determined, the auto loop 205 determines whether the brightness of the display should be increased or decreased. Specifically, at decision block 210, it is determined whether BS# is equal to BS#N. If so, the auto loop 205 will proceed to step 219, which will direct the process to step 263, which will be described in more detail below. Otherwise, the auto loop 205 will proceed to decision block 212, whereby it will be determined whether the new brightness step number is greater than the desired brightness step number. If BS#N is less than BS#, the auto loop 205 will proceed to step 214, whereby BS# is decremented. Otherwise, if BS#N is greater than BS#, the auto loop sequence 205 will increment BS# at 216, as is now described with reference to FIG. 4.

Specifically, the BS# decrementing process 214 begins at step 240, wherein a delta number of steps (D#S) is determined to be the difference of BS# and BS#N. Next, at step 242, an update time TU is determined to be the product of D#S and a predetermined time constant TC1. At step 244, the real-time is read into TN, and T is subtracted from TN to determine ΔT at step 246. Recall that T was initialized as the real-time value at step 236. Because it was determined that BS#N is less than BS#, and it is therefore desirable to decrease BS#, a variable "ONE" is set to −1. Next, at decision block 260, the auto loop 205 determines whether ΔT is greater than TU. If so, BS# will be updated at step 262, as will be described below.

If, however, it is determined at decision block 212 that BS#N is greater than BS#, BS# will be incremented at step 216. Specifically, with continuing reference to FIG. 4, DS# will be computed as BS#N minus BS# at step 250. Next, at step 252, TU is calculated as the product of D#S and a second time constant TC2. Next, the real-time information will be read into TN and ΔT will be determined as described above, at steps 254 and 256 respectively. Because BS# is being incremented in this scenario "ONE" will be set to +1 at step 258, and the sequence 216 will proceed to decision block 260.

Once the variable "ONE" has been determined, the auto loop 205 will determine whether sufficient time has passed from the previous update at decision block 260. Accordingly, if ΔT is greater than TU, indicating the passage of sufficient time, then BS# will be adjusted to BS#+"ONE" at step 262. Accordingly, the brightness step number will be decremented by a value of 1 during process 214, and will be incremented by a value of 1 if the auto loop 205 has executed process 216. Once BS# has been updated, the auto loop 205 will reset T and TN at step 263 before proceeding to step 220, whereby the DAC count will be updated. On the contrary, if it is decided that ΔT is not greater than TU at decision block 260, the loop 205 will proceed to step 220, as denoted by step 264, without resetting T or TN. Of course, TN will be updated the next time step 244 or 254 are processed until ΔT is greater than TU.

Figure 5:
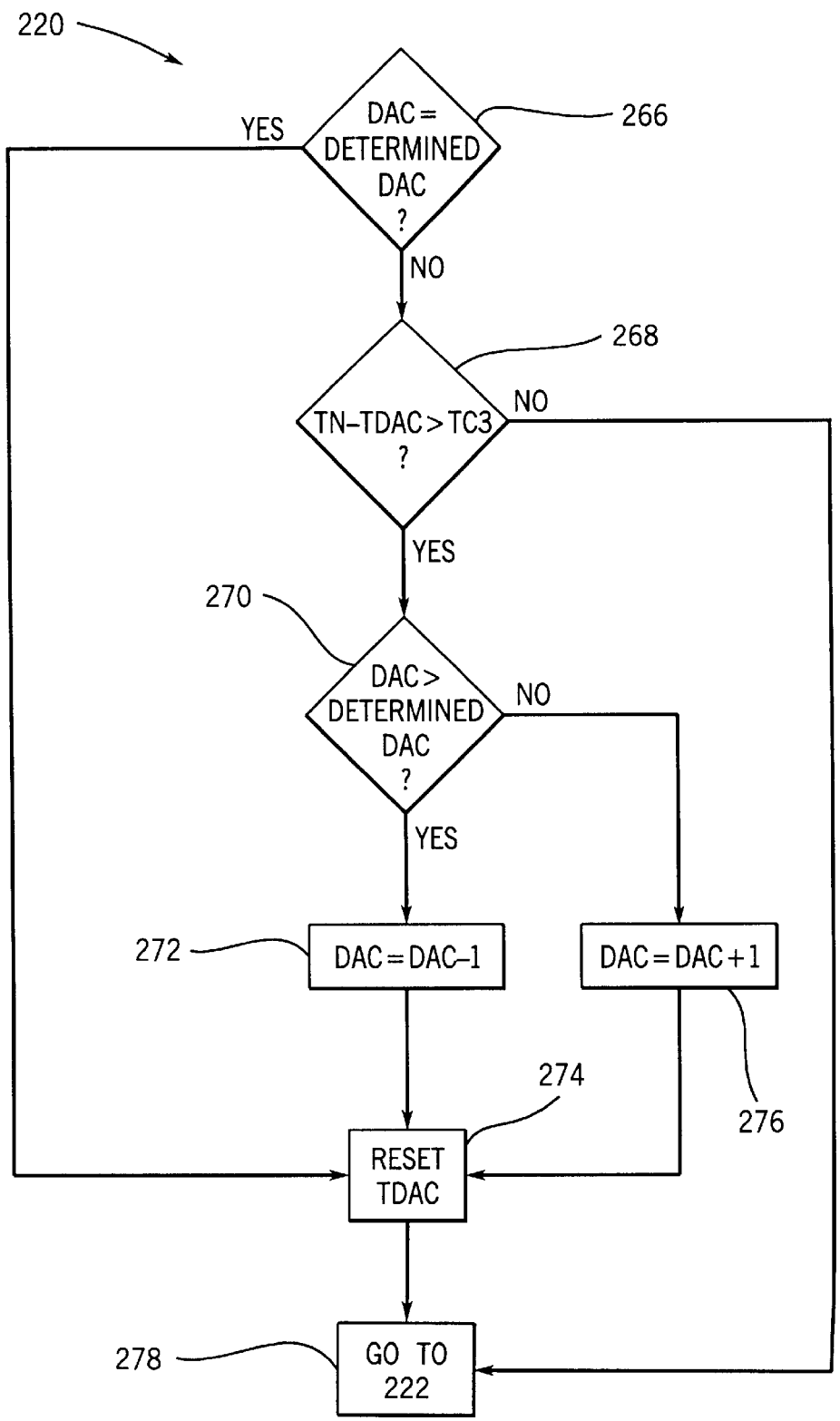
FIG. 5 is a flow chart of the steps performed to carry out the DAC update step of FIG. 2.

Referring now to FIG. 5 in particular, subloop 220 is executed to increment or decrement the current DAC count towards the DAC value corresponding to BS# in the look-up table. For instance, if BS# was incremented by 1 at step 262, the DAC count will correspondingly be incremented by a value of 1. Even though the DAC count incrementation may not result in the new DAC count corresponding to the present BS# as defined in the look-up table, successive incrementations of the DAC count will ultimately result in such equivalence. Therefore, even if ΔT was determined not to be greater at TU at decision block 260, or if BS# was not altered, the DAC count may still be incremented or decremented during subloop 220 if the previous adjustment to the DAC count did not adjust the DAC count to correspond with current BS#, as defined in the look-up table. Accordingly, at decision block 266, the subloop 220 will determine whether the current DAC count equals the DAC count corresponding to (BS#+SNS−5), as defined by the look-up table. If the values correspond, there will be no need to update the DAC count, and the subloop 220 will proceed to step 274 to reset TDAC to Real Time. Otherwise, if decision block 266 determines that the values do not correspond, it will be determined at step 268 whether the difference between TN and TDAC is greater than a third time constant TC3. Recall that if BS# was incremented or decremented at steps 216 or 214, TN will have been updated at step 263 (or steps 244 or 254 if "No" at decision block 260) while TDAC was set to the real-time at step 236. Therefore, if sufficient time has passed between steps 236 (or step 274 after the first time) and 263, such that TN minus TDAC is greater than TC3, subloop 220 will proceed to decision block 270. Otherwise, if insufficient time has elapsed, the difference between the two will therefore not be greater than TC3, and subloop 220 will proceed to step 278 without resetting TDAC.

At decision block 270, it is decided whether the DAC count should be incremented or decremented. For instance, if the current DAC count is greater than the DAC value corresponding to (BS#+SNS−5) in the look-up table, then DAC will be decremented by a value of 1 at step 272. Otherwise, if the current DAC count is less than the DAC count value corresponding to (BS#+SNS−5), then the current DAC count will be incremented by the value of 1 at step 276. Once the DAC count has been incremented or decremented, the subloop 220 will proceed to step 274, whereby the TDAC is once again reset to Real Time, and the subloop will revert to step 222, as indicated at step 278. Adjusting the DAC count by a value of I allows the brightness level of the CCFL 110 to be adjusted a sufficiently small amount so as not to be observed by the user. On the contrary, if the DAC count was adjusted to immediately equal the value corresponding to the current (BS#+SNS−5) as defined in the look-up table, the adjustment made to the DAC count would likely be orders of magnitude greater than one, thereby resulting in relatively large brightness changes to the backlight that would be observed by the operator.

In accordance with the preferred embodiment, TC3 is less than TU to permit the DAC count to update towards a steady state condition with respect to the BS# even in situations that the BS# was not adjusted during the previous iteration.

Referring again to FIG. 2, a variable SNS0 is set to the current SNS value at step 222 in preparation for reading a new operator-selected SNS value, which is performed at step 224. At decision block 226, if the read SNS value is still equal to SNS0, thereby indicating no change to the SNS, the auto loop 205 will continue to step 206 as described above. If, on the other hand, SNS is not equal to SNS0, the DAC count will once again be determined at step 204, as described above. Accordingly, when the user manually changes the brightness, an immediate (within 50 mS) response is achieved without going through the variable rate control filter process.

Figure 6:
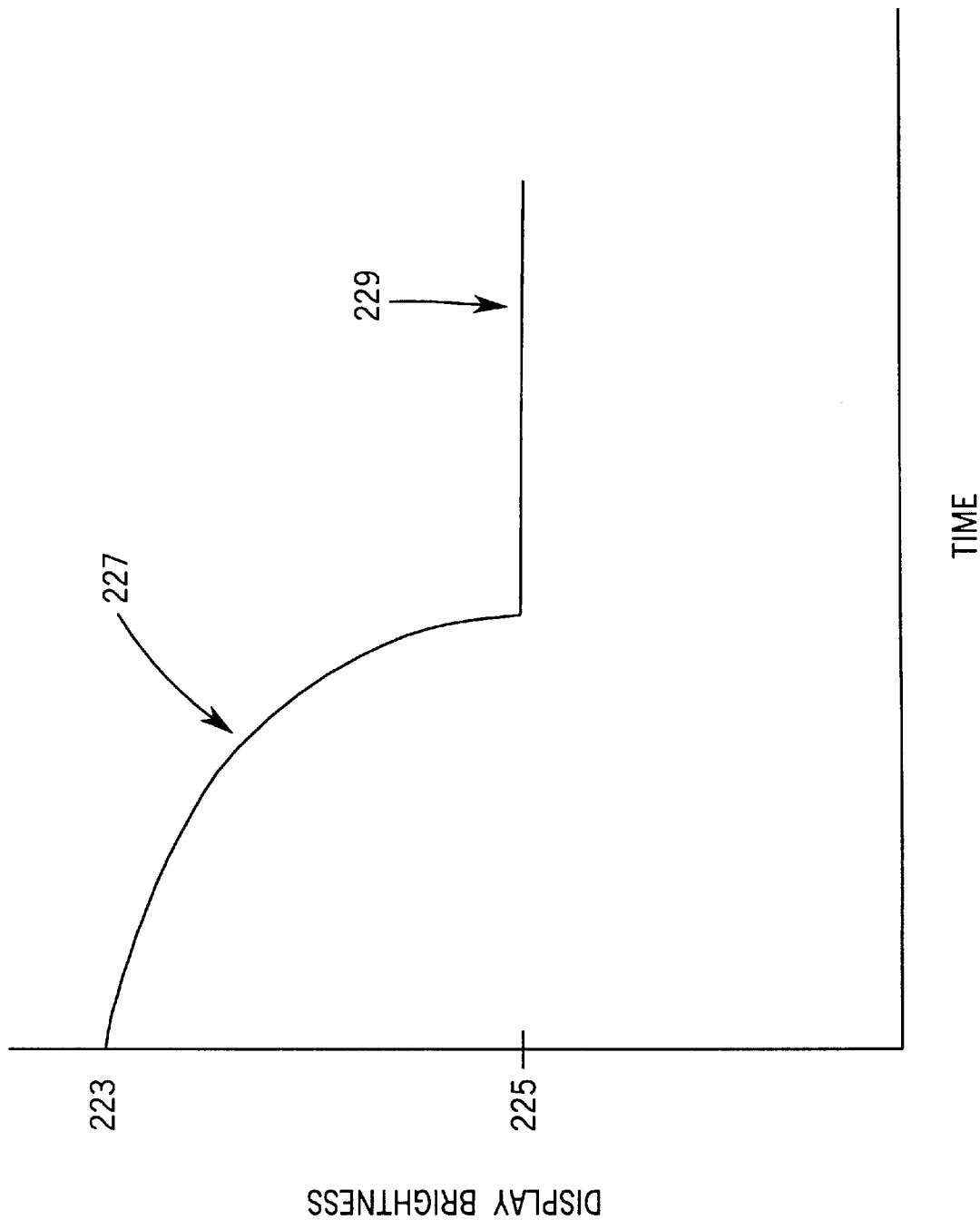
FIG. 6 is a graph illustrating the response time between actual and desired display brightness levels in accordance with the preferred embodiment.

It should be appreciated that as difference between BS#N and BS# decreases, D#S will decrease, thereby decreasing the necessary update time interval TU. As a result, the brightness of the display will be corrected at faster rates as the actual display brightness level approaches the desired brightness level. In particular, referring to FIG. 6, a graph is shown, not necessarily to scale, illustrating the change in an actual display brightness level 223 over a period of time once a lower ambient illumination level is detected. As will be further described below, the newly detected lower ambient illumination level corresponds to a desired display illumination level 225. Assuming a steady state condition exists prior to the new sensed ambient illumination level, and that no changes to the ambient illumination level are detected before the next steady state condition, the actual display brightness level plotted against time is a concave parabolic curve 227 indicating the increasing rate of change of actual display brightness 223 as it approaches the desired display brightness 225. Once the actual display brightness 225 has reached the desired display brightness, a steady state 229 will once again be reached. Furthermore, time constants TC1 and TC2 may be selected having different values so as to decrease the response time when the brightness is incremented relative to when the brightness is decremented by selecting a value for TC1 that is more than TC2. By selecting TC2<TC1, the brightness will increment faster than it decrements, thereby maintaining the display brightness at higher levels under intermittent shading conditions and acting like a peak ambient light detector.

The invention has been described in connection with what are presently considered to be the most practical and preferred embodiments. However, the present invention has been presented by way of illustration and is not intended to be limited to the disclosed embodiments. For instance, it should be appreciated that the functions performed by the hardware elements, such as DAC 108, could also be performed by appropriately programmed microprocessors or other alternative software or hardware apparatus. Additionally, while the preferred embodiment has described in conjunction with a CCFL, it should be appreciated that the present invention could be used in conjunction with other backlights, such as an LED backlight and other emissive displays such as FED or OLED and, accordingly, the present invention is not intended to be limited in scope to using a CCFL.

It should further be appreciated that while the preferred embodiment has been described with reference to a vehicle instrument display, it could be equally applicable for other types of displays. For example, it may be desirable to control the brightness levels of battery operated displays, such as laptop personal computers, or personal digital assistants, such as PALM organizer, so as to reduce battery consumption and improve longevity. The invention is therefore not intended to be limited to controlling brightness of vehicular displays.

Those skilled in the art will realize that the invention is intended to encompass all modifications and alternative arrangements included within the spirit and scope of the invention, as set forth by the appended claims.

We claim:

1. A system for controlling brightness of an emissive display, comprising:

(A) an ambient light sensor configured to output an ambient signal corresponding to a sensed ambient illumination level;

(B) a display configured to receive an actual display brightness signal and to adjust an actual display brightness level based on said actual display brightness signal; and (C) a processor executing a stored program to:
(1) receive said ambient light signals;
(2) determine a desired display brightness level corresponding to said ambient light signal; and
(3) output said actual display brightness signal to said display, wherein said actual display brightness level is adjusted at a rate of change, and wherein said rate of change increases as a magnitude of the difference between said desired display brightness level and said actual display brightness level decreases.

2. The system of claim 1, wherein said actual display brightness level is less than desired display brightness level, and wherein said actual display brightness level is is incremented based on said actual display brightness signal.

3. The system of claim 1, wherein said actual display brightness level is greater than said desired display brightness level, and wherein said actual display brightness level is decremented based on said actual display brightness signal.

4. The system of claim 1, wherein said processor determines an update interval based at least in part on said magnitude of the difference between said desired display brightness level and said actual display brightness level, and wherein said rate of change is no less than said update time interval.

5. A method for controlling brightness of an emissive instrument display, comprising:
(A) receiving a first signal indicating an actual display brightness level;
(B) determining a second signal that is related to a desired display brightness level, wherein the desired display brightness level is at least partially dependent upon an ambient illumination level;
(C) determining a brightness difference magnitude between said first and second signals; and
(D) adjusting said actual display brightness level after expiration of an update time interval, wherein said update time interval is at least partially dependent upon said brightness difference magnitude.

6. The method as recited in claim 5, wherein said actual display brightness level is less than said desired display brightness level, step (D) further comprising incrementing said actual display brightness signal.

7. The method as recited in claim 5, wherein said actual display brightness level is greater than said desired display brightness level, step (D) further comprising decrementing said actual display brightness level.

8. The method as recited in claim 5, wherein said update time interval decreases as said brightness magnitude difference decreases.

9. The method as recited in claim 5, wherein said update time interval increases as said brightness magnitude difference increases.

10. The method as recited in claim 5, wherein said update time interval equals said brightness magnitude difference multiplied by a predetermined time constant.

11. The method as recited in claim 10, wherein said first signal is received at an initial time T, and wherein said second signal is received at a second time T1, wherein T1 is greater than T, and wherein step (D) further comprises:
subtracting T from T1 to determine a time difference variable; and
adjusting said actual brightness level when said time difference variable is greater than said update time interval.

12. The method as recited in claim 10, wherein said time constant is a first time constant if said actual display brightness level is greater than said desired display brightness level, and wherein said time constant is a second time constant if said actual display brightness level is less than said desired display brightness level, and wherein said first time constant is greater than said second time constant.

13. The method as recited in claim 5, further comprising manually adjusting said actual brightness level.

14. The method as recited in claim 5, wherein said desired brightness level is related to an ambient illumination condition.

15. The method as recited in claim 5, wherein actual brightness level is adjusted by one of increasing said actual brightness level and decreasing said actual brightness level, and wherein said actual brightness level is increased at a faster rate than it is decreased.

16. The method as recited in claim 5, wherein said actual brightness level is adjusted in small increments so as to be unnoticeable to the human eye.

17. The method as recited in claim 5, wherein said first signal is predetermined.

18. A method for controlling brightness of an emissive display, comprising:
(A) determining a first signal indicating an actual display brightness level at a first time T1;
(B) determining a second signal substantially related to a desired display brightness level at a second time T2;
(C) determining a difference magnitude between said first and second signals;
(D) determining a predetermined update time interval, wherein said update time interval is the product of said difference magnitude and a predetermined time constant;
(E) adjusting said actual display brightness level when the difference between T2 and T1 is greater than said update time interval.

19. The method as recited in claim 18, wherein step (E) further comprises incrementing said actual brightness level if said desired brightness level is greater than said actual brightness level.

20. The method as recited in claim 18, wherein step (E) further comprises decrementing said actual brightness level if said desired brightness level is less than said actual brightness level.

21. The method as recited in claim 18, wherein step (E) comprises one of incrementing and decrementing said actual brightness level, wherein said update time interval when said actual brightness level is incremented is less than said update time interval when said actual brightness level is decremented.

22. A system for controlling brightness of an illuminated instrument panel, comprising:
(A) means for receiving a first signal generally related to an actual brightness level;
(B) means for receiving a second signal that is related to a desired brightness level, wherein the desired display brightness level is at least partially dependent upon an ambient illumination level;
(C) means for determining a brightness difference magnitude between said first and second signals; and
(D) means for adjusting said actual brightness level after expiration of a predetermined update time interval, wherein said update time interval is at least partially dependent upon said difference magnitude.

23. The system as recited in claim 22, further comprising means for incrementing said actual brightness level if said desired brightness level is greater than said actual brightness level.

24. The system as recited in claim 22, further comprising means for decrementing said actual brightness level if said desired brightness level is less than said actual brightness level.

25. The system as recited in claim 22, wherein said update time interval increases as said brightness difference magnitude increases, and wherein said update time interval decreases as said brightness difference magnitude decreases.

26. A system for controlling brightness of an emissive display, comprising:
   (A) an ambient light sensor configured to output an ambient signal corresponding to a sensed ambient illumination level;
   (B) a display configured to receive an actual display brightness signal and to adjust an actual display brightness level based on said actual display brightness signal; and
   (C) a processor executing a stored program to:
      (1) receive said ambient light signals;
      (2) determine a desired display brightness level corresponding to said ambient light signal; and
      (3) output said actual display brightness signal to said display, wherein said actual display brightness level is adjusted at a rate of change, and wherein said rate of change decreases as a magnitude of the difference between said desired display brightness level and said actual display brightness level increases.

27. The system of claim 26, wherein said actual display brightness level is less than said desired display brightness level, and wherein said actual display brightness level is incremented based on said actual display brightness signal.

28. The system of claim 26, wherein said actual display brightness level is greater than said desired display brightness level, and wherein said actual display brightness level is decremented based on said actual display brightness signal.

29. The system of claim 26, wherein said processor determines an update interval based at least in part on said magnitude of the difference between said desired display brightness level and said actual display brightness level, and wherein said rate of change is no less than said update time interval.

30. The system of claim 26, wherein said processor determines said actual display brightness signal based on said desired display brightness level along with a previous actual display brightness level.

31. The system of claim 1, wherein said processor determines said actual display brightness signal based on said desired display brightness level along with a previous actual display brightness level.

* * * * *